United States Patent

[11] 3,572,944

| [72] | Inventors | John V. Hanline<br>Kansas City, Mo.;<br>Daniel M. Chapin, Shawnee Mission, Kans. |
|---|---|---|
| [21] | Appl. No. | 801,308 |
| [22] | Filed | Feb. 24, 1969 |
| [45] | Patented | Mar. 30, 1971 |
| [73] | Assignee | Film Equipment Manufacturing Co.<br>Kansas City, Mo. |

[54] SYSTEM FOR ANALYZING COLOR SAMPLES
7 Claims, 6 Drawing Figs.

[52] U.S. Cl. .................................................. 356/177,
250/228, 356/206, 356/215, 356/236
[51] Int. Cl. ........................................................ G01j 3/46
G01n 21/22, G01j 1/46
[50] Field of Search............................................ 356/176,
177, 201–206, 215, 236, 51; 250/278

[56] References Cited

UNITED STATES PATENTS

| 2,483,452 | 10/1949 | Berkley ....................... | 356/176 |
|---|---|---|---|
| 2,686,452 | 8/1954 | Bentley ....................... | 250/228(X) |
| 2,882,786 | 4/1959 | Kaye ............................ | 356/177 |
| 3,003,388 | 10/1961 | Hunter et al. ................ | 356/176 |
| 3,159,742 | 12/1964 | Davidson..................... | 356/176(X) |
| 3,314,327 | 4/1967 | Killpatrick et al. ........... | 356/176(X) |
| 3,327,583 | 6/1967 | Vanderschmidt et al..... | 356/236 |
| 3,330,904 | 7/1967 | Gebel........................... | 356/177UX |
| 3,455,637 | 7/1969 | Howard........................ | 356/205X |
| 3,471,242 | 10/1969 | Nichols ........................ | 356/177X |
| 3,490,849 | 1/1970 | Hambleton................... | 356/176 |

FOREIGN PATENTS

| 623,584 | 7/1961 | Canada ....................... | 356/177 |

OTHER REFERENCES

Ward, Proc of Amer. Assn. Textile Chemists. *Amer. Dyestuff* Reporter. U.S.S., No. 24, pp 55-61, Nov. 21, 1966, 356/177

Primary Examiner—Ronald L. Wibert
Assistant Examiner—Warren A. Sklap
Attorney—Fishburn, Gold and Litman ABSTRACT: A system for analyzing color samples, such as film and filters, has a light-transmission box and a signal processor wherein a color sample to be analyzed is placed over an aperture through an illuminated translucent window in an upper surface of a transmission box. A lamp is mounted to direct a light beam through a plurality of infrared filters into an entrance of an integration bar having an exit aligned with the aperture through the translucent window thereby directing a diffused light beam through the color sample into a light-collecting member. A plurality of color-sensitive phototubes are each responsive to a chromatically differing component of the light directed through the color sample and are positioned to receive light from the light collecting member. The color-sensitive phototubes are operatively connected to the signal processor wherein computation means analyze the light received by the phototubes and display numerical density values.

INVENTORS.
JOHN V. HANLINE and
DANIEL M. CHAPIN
BY
ATTORNEYS

INVENTORS.
JOHN V. HANLINE and
DANIEL M. CHAPIN
BY Fishburn, Gold and Litman
ATTORNEYS INVENTORS.
JOHN V. HANLINE and
DANIEL M. CHAPIN
BY Fishburn, Gold and Litman
ATTORNEYS

SYSTEM FOR ANALYZING COLOR SAMPLES

The present invention relates to photographic apparatus and more particularly to signal transmission and signal processing in a system for analyzing color samples.

A simultaneous red, green and blue density readout is given on the numerical display for the color sample. The density information is then introduced into a companion subtractive computer where it is compared with a standard control film and its associated subtractive printing filter pack densities. The computer answer is a net green and net blue density display of a subtractive filter pack for use with the color sample.

A filter pack made to match the display and combined with the sample (color film) can then be placed in a printing apparatus. The resultant print should approximate a print made from the standard control film in color balance.

An assembled filter pack has red, green and blue density values. In a given primary system, equal values of red, green and blue density produce gray. Unequal density values modulate the light such that the pack assumes a hue desaturated by gray. The color characteristics of the filter pack can best be described by subtracting the gray or neutral density component. The neutral density component is a function of unwanted spectral absorption by some of the filter dyes and of optical interfaces of the filters in combination.

In a typical system, filter packs are assembled from mainly red, magenta and yellow filters. Red is common to all three colors. Magenta is red and blue in combination. Yellow is red and green in combination. Any red density recorded in the above-described system can, by the definition above, be called neutral density.

Thus in a typical filter pack the density readings would be:
1. $Red_den + Green_den + Blue_den$ The color and speed characteristics would be defined:

$$(2) \frac{R_{den} + G_{den} + B_{den} - R_{den} - R_{den}}{R_{den} + (G_{den} - R_{den}) + (B_{den} - R_{den})}$$

which reduces to:

3. $N.D. + G_{net\ den} + B_{net\ den}$

The analyzing system described in densitometer mode gives formula (1) above. In analyzer mode, it gives formula (3) above.

The principal objects of the present invention are: to provide a system for rapidly densitometering a color sample by giving simultaneous red, green and blue density readings and to evaluate a subtractive printing filter pack in terms of neutral and net color density; to provide such a system for analyzing color film wherein the procedure is simple and direct and density values are provided in response to photographic testing for the filter components of a pack having specific color characteristics necessary to make a high quality print; and to provide such a system for analyzing color film which is economical to manufacture, easily maintained, positive and direct in operation, and particularly well suited for the proposed use.

Other objects and advantages of this invention will become apparent from the following description taken in connection with the accompanying drawings wherein are set forth by way of illustration and example certain embodiments of this invention.

Figure 1:
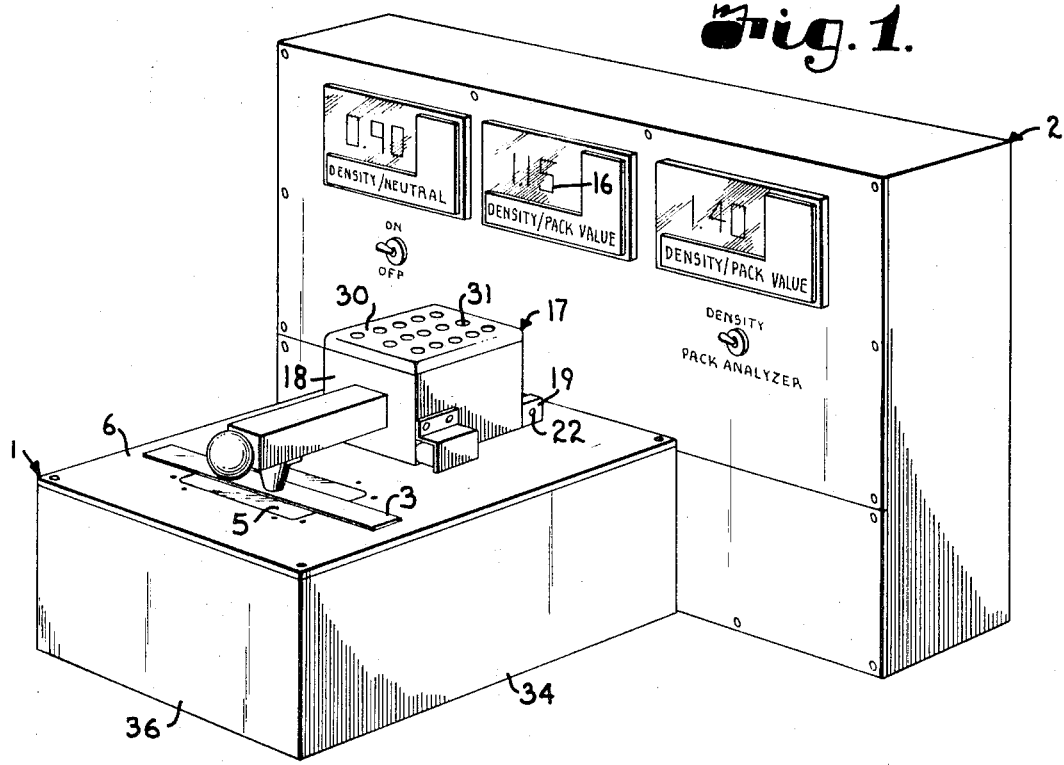
FIG. 1 is a perspective view of a light-transmission box and signal processor embodying features of the present invention.
Figure 2:
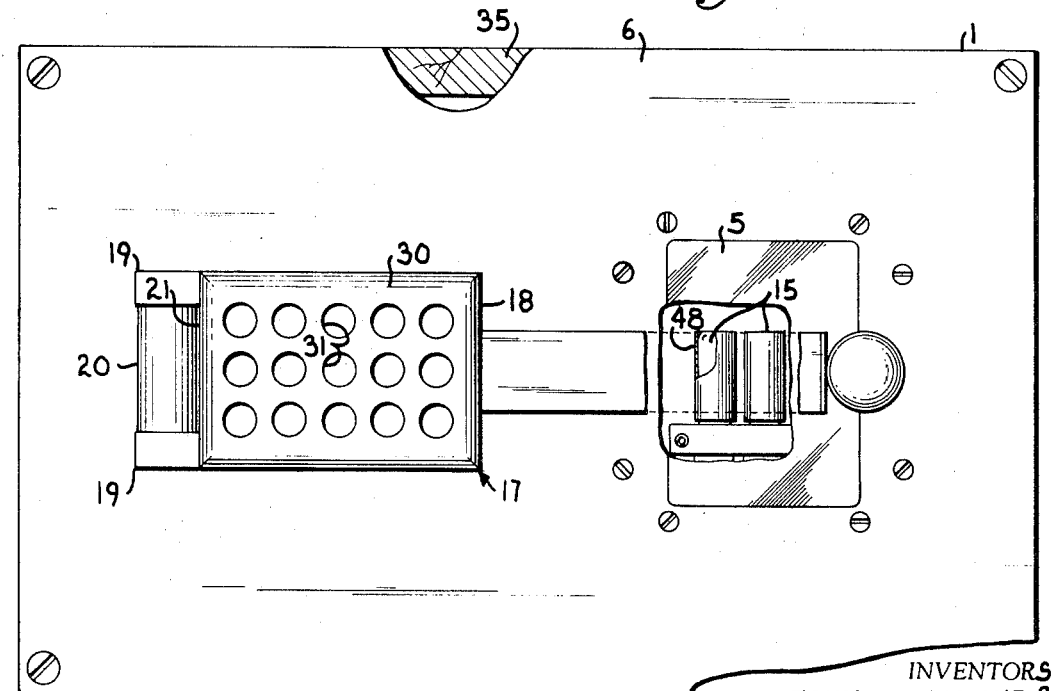
FIG. 2 is a plan view of the transmission box with portions broken away to better illustrate the component parts therein.
Figure 3:
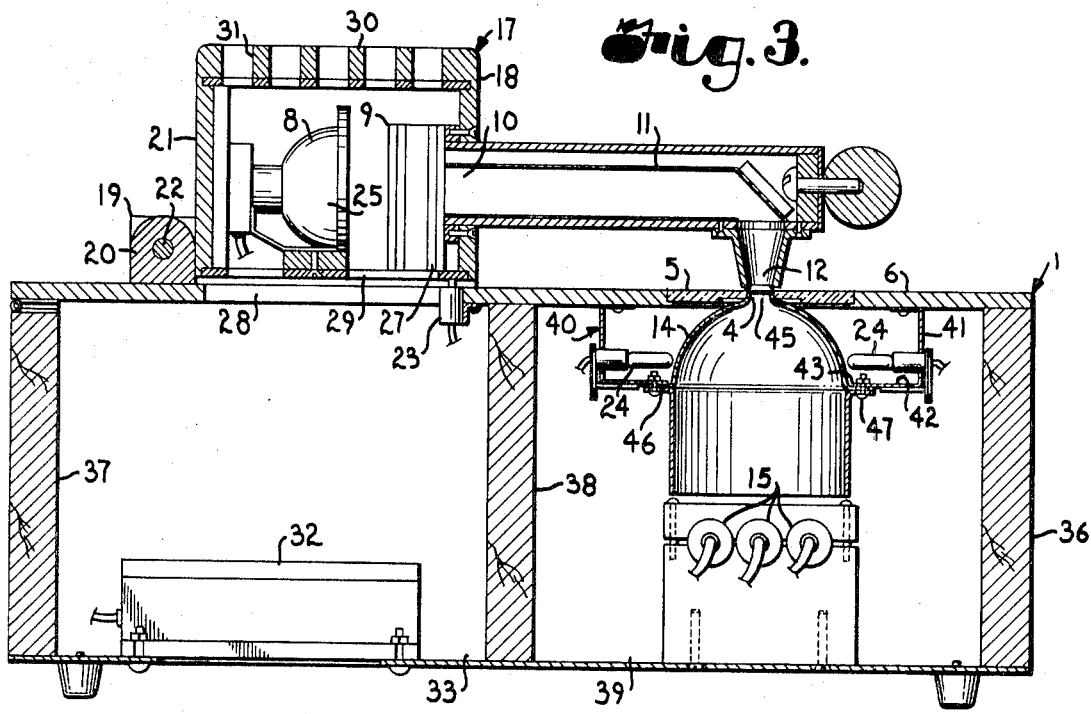
FIG. 3 is a longitudinal sectional view through the transmission box.
Figure 4:
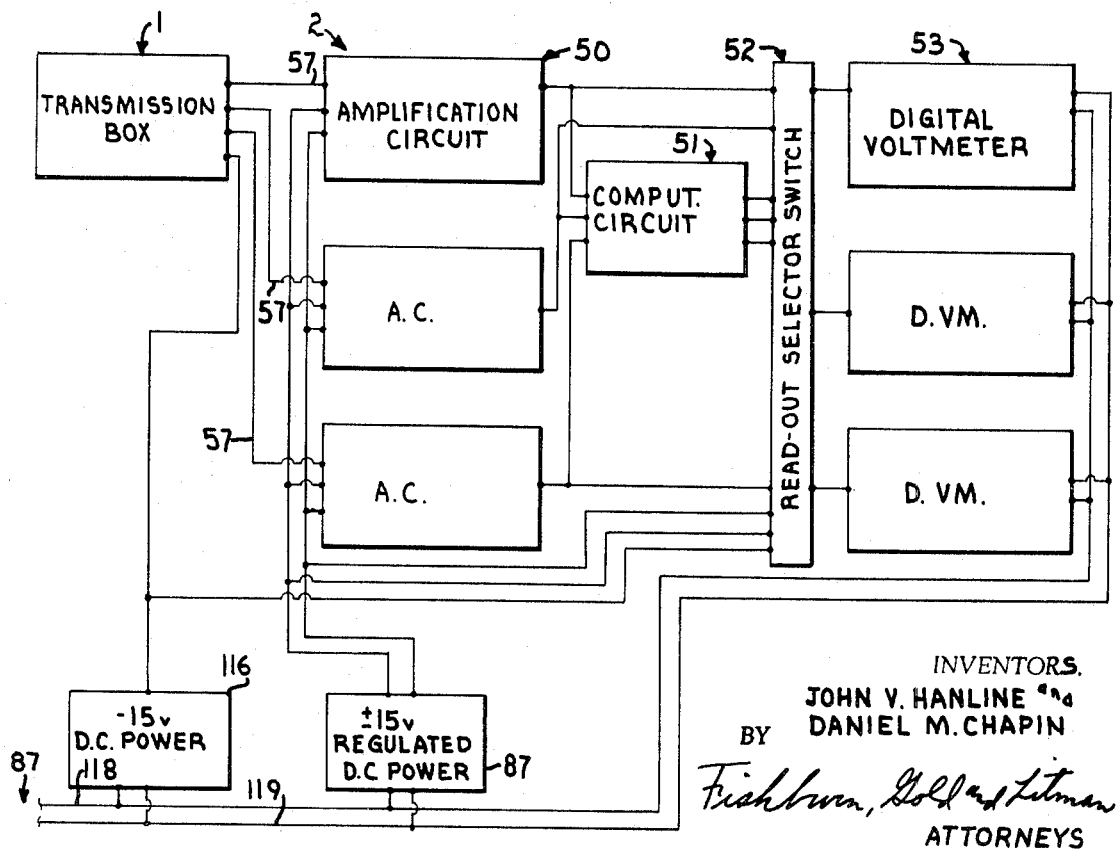
FIG. 4 is a wiring diagram of the signal processor with the essential operating parts diagrammatically shown.
Figure 5:
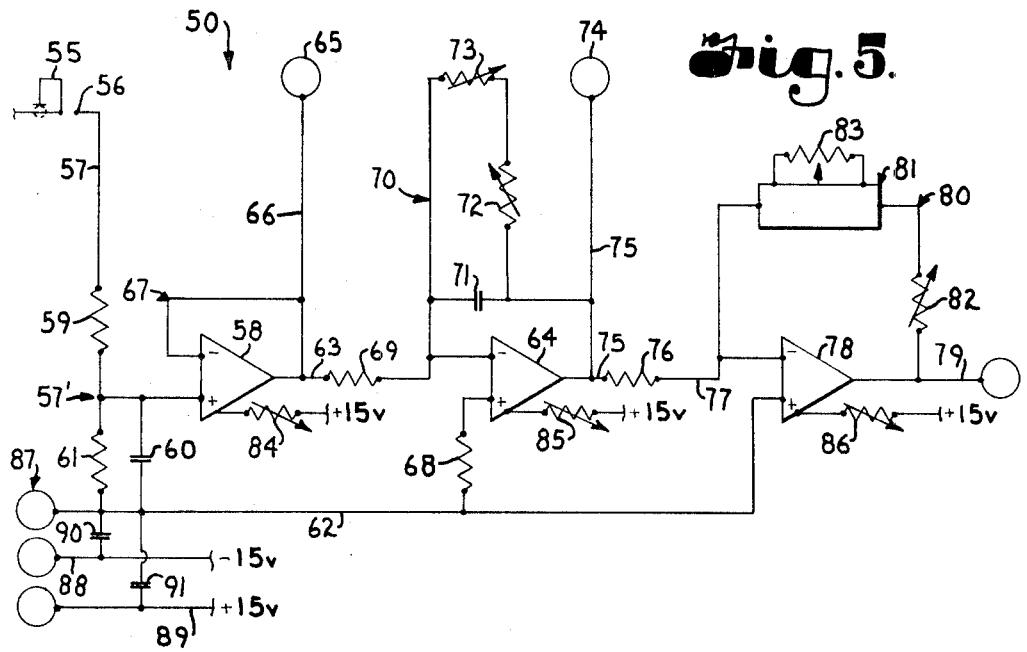
FIG. 5 is a detailed wiring diagram for one amplification circuit for the signal processor.
Figure 6:
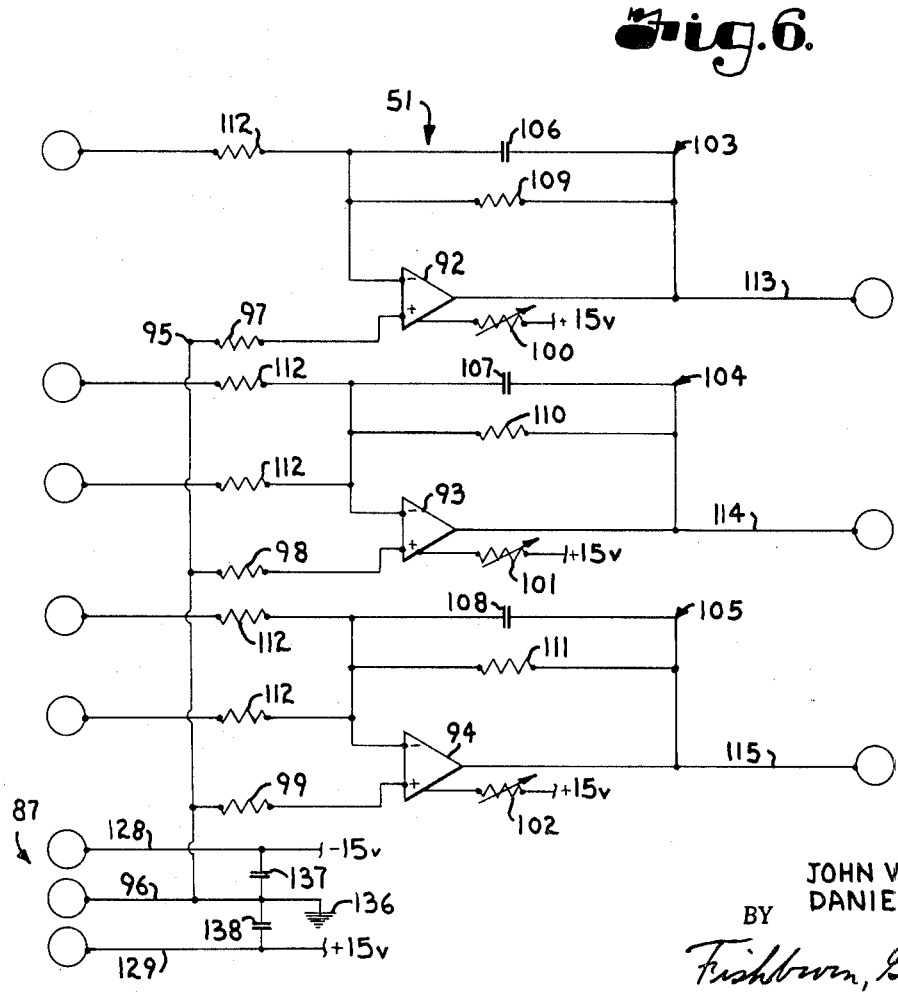
FIG. 6 is a detailed wiring diagram for a computation circuit for the signal processor.

Referring more in detail to the drawings:

The reference numeral 1 generally designates a transmission box for use with a signal processor 2 in a system for analyzing color samples 3. Each sample is placed over an aperture 4 with light directed through a translucent window 5 positioned in an upper surface 6 of the transmission box 1. A lamp 8 is mounted to direct a light beam through a plurality of infrared filters 9 into an entrance 10 of light-integration means, such as a tubular integration bar 11 having an exit 12 alignable with the aperture 4 through the translucent window 5, thereby directing a diffused light beam through the color sample 3 into a light-collecting member 14. A plurality of color-sensitive phototubes 15 are positioned to receive light from the light-collecting member 14 and are each responsive to a chromatically differing component of the light directed through the color sample 3. The color-sensitive phototubes 15 are operatively connected to the signal processor 2 wherein electrical means analyze the light received by each of the phototubes 15 and display numerical density values 16.

The lamp 8 and the integration bar 11 are pivotally mounted on the upper surface 6 of the transmission box 1 whereby the integration bar 11 may be moved upwardly thereby moving the exit 12 from the aperture 4.

In the illustrated structure, a lamp housing 17 has the lamp 8 mounted therein with the integration bar 11 extending outwardly from one sidewall 18 thereof. The pivotal mounting of the lamp housing 17 on the upper surface 6 of the transmission box 1 includes a pair of spaced ribs 19 extending upwardly from the upper surface 6 and an arm 20 extending outwardly from an opposite sidewall 21 of the lamp housing 17. A pivot member, such as an elongated rod 22, extends through the ribs 19 and arm 20 to provide the pivotal mounting of the lamp housing 17 on the transmission box 1.

A switch 23, preferably of the normally on pushbutton switch type, is positioned on the upper surface 6 of the transmission box 1 whereby the button is engaged by the one sidewall 18 of the lamp housing 17 as the lamp housing is moved toward the aperture 4 actuating the switch to interrupt the circuit controlled thereby. The switch 23 is operatively connected to a plurality of lamps 24 positioned within the transmission box 7 and below the translucent window 5 for illuminating the aperture surround when the lamp housing 17 and integration bar 11 are in an upward position. The lamps 24 provide sufficient illumination through the translucent window 5 to permit easy location of a selected portion of the color sample 3 to be densitometered.

The switch 23 also controls a circuit to the lamp 8 within the lamp housing 17 and is operative to complete the circuit to said lamp 8 when the housing is in lowered position and the exit 12 of the integration bar 11 is aligned with the aperture 4 through the translucent window 5. Operation of the switch 23 to energize the lamp 8 effects interruption of the circuit to the lamps 24 thereby having only a measured intensity of light directed through the color sample 3 to measure densities of selected primary colors present in the color film 3.

In the illustrated structure, the lamp 8 is a quartz halogen lamp precisely positioned at the focal point of an ellipsoidal reflector surface 25 which is a dichroic mirror which passes infrared energy and reflects the visible portion of the spectrum directing same through a series of infrared rejection or hot mirrors 9 and then through the entrance 10 of the integration bar 11. It is preferable to coat the interior of the integration bar 11 as with an anodic coating, particularly a mirror anodic coating, to increase the efficiency of the multiple internal reflections therein whereby the light, by multiple internal reflections and without the aid of any optics, is diffused light and caused to impinge on the receiver aperture 4.

The lamp 8 and the reflector surface 25 produce substantial heat whereby it becomes desirable to dissipate said heat in order to obtain reliable numerical density values 16. Therefore, a plurality of heat dissipating members 27 in the form of ribs or fins are positioned in heat conducting contact with the hot mirrors 9. The heat dissipating members 27 and the hot mirrors 9 are positioned above an opening 28 through the upper surface 6 of the transmission box 1. The opening 28 is sized to be slightly smaller than exterior dimensions of the lamp housing 17 which also has an opening 29 through the lower portion thereof with the opening 29 being aligned with the lamp 8 and reflective surface 25 and with the hot mirrors 9 and the heat dissipating members 27.

A top member 30 of the lamp housing 17 has a plurality of longitudinally and transversely spaced apertures 31 therethrough whereby a fan 32 positioned within a fan chamber 33 within the transmission box 1 will direct a flow of cooling air upwardly through the openings 28 and 29 thereby flowing around the lamp 8 and reflector surface 25 and the hot mirrors 9 and heat dissipating members 27 and upwardly and outwardly through the apertures 31 through the top member 30.

The transmission box 1 is an elongated structure having sidewalls 34 and 35 and end walls 36 and 37. An intermediate wall 38 is positioned between the end walls 36 and 37 and extends between the sidewalls 34 and 35 thereby defining the fan chamber 33 and a light chamber 39.

The translucent window 5 is positioned in the upper surface 6 above the light chamber 39. An illuminating housing 40 surrounds the translucent window 5 and depends from the upper surface 6 within the light chamber 39. The illuminating housing 70 is formed of a plurality of sidewalls 41 and a bottom wall 42 having an aperture 43 therethrough. The lamps 24 are positioned within the illuminated housing 70 and light-collecting member 14 is positioned within the illuminating housing 40 with the lamps 24 surrounding same.

The light-collecting member 14 has an entrance 45 aligned with the aperture 4 through the translucent window 5, and, in the illustrated structure, the light-collecting member 14 is generally an integrating member in the form of a substantially hemispherical upper portion and a generally cylindrical lower portion with flanges 46 extending radially outwardly to be secured to the bottom wall 42 adjacent the aperture 43 therethrough, as by a plurality of circumferentially spaced screws or bolts 47.

The light beam from the lamp 8 and integration bar 11 passes through the color sample 3, through the aperture 4 through the entrance 45, and into the light-collecting member 14 which preferably has a nonglossy, diffusely reflecting white material on an interior surface thereof and an exit immediately over the tubes 15 to direct a diffused light to each of the photo tubes 15 whereby the strength of signal produced is independent of the position of the respective tube.

It is desireable to obtain the integral density of the primary colors, red, green and blue, present in the color sample 3. Therefore, the phototubes 15 are color-sensitive and positioned within the light chamber 39 to receive light from the light-collecting member 14. Each of the phototubes 15 are responsive to a chromatically differing component of light from the color film positioned between the integration bar exit 12 and the translucent window aperture 4.

In the illustrated structure, the phototubes 15 are responsive to the primary colors of red, green and blue and each is spectrally isolated with a filter 48 of a chromatically differing component, such as red, green and blue. The phototubes 15 are electrically connected to the signal processor 2 which analyzes light directed through the color sample 3 and the light-collecting member 14 for displaying numerical density values 16. The spectral bands of the filters 48 are selected to produce electrical signals corresponding to the spectral response functions desired.

The signal processor 2 houses the electrical means which are operatively connected to the color-sensitive phototubes and includes a plurality of amplification circuits 50, each associated with a respective phototube 15 for amplifying the respective signal corresponding to one of the primary colors. The electrical means includes a computation circuit 51 electrically connected to all of the amplification circuits 50 for providing a voltage response corresponding to neutral integral density and subtracting the neutral density from the other readings to provide neutral density and net densities.

A readout selector switch 52 is electrically connected to each of the phototubes 15 and to the amplification circuits 50 and to visual indicators, such as a digital voltmeter 53, associated with each of the primary colors for displaying the numerical density values 16.

In the illustrated structure, red or neutral density is displayed and net integral green density and net integral blue density are displayed for providing complete speed and color characteristics of a filter pack (not shown) for making color prints from color film. It is noted that the computation circuits 51 and the amplification circuits 50 could be changed to provide either green or blue density as the neutral density with the other density values being expressed as integral net density relative to the subtracted density. It is preferable to use the lower density as the neutral density.

The phototubes 15 within the light chamber 39 of the transmission box 1 function as a red channel, a green channel and a blue channel with each having a shielded wire connection 55 within the light chamber 39. A mating connection 56 for each of the channels is electrically connected to the respective amplification circuit 50.

Each of the amplification circuits 50 for the respective primary color channels includes a conductor 57 extending between the respective mating connection 56 and an operational amplifier 58. The conductor 57 has a first resistor 59 therein in the nature of a 100 K. ohm, ¼ w., (+ or −) 1 percent resistor and a second resistor 61 which is in the nature of a 1 M. ohm, ¼ w., (+ or −) 1 percent resistor. A filtering capacitor 60 in the nature of a 0.1 mfd. capacitor is connected across the second resistor 61 and both are connected to a common ground 62, as later described.

The conductor 57 is connected to an input side of the operational amplifier 58 through an input network 57'. An output conductor 63 extends between the operational amplifier 58 and a second operational amplifier 64. A test point 65 is connected to the output conductor 63 by a conductor 66. An amplification completion loop 67 extends between the operational amplifier 58 and the conductor 66. The described circuit is a voltage follower connected operational amplifier which has very high input impedance to prevent distortion of the signal generated by the respective phototube 15.

The second operational amplifier 64 is used to standardize the input signal to a fixed level and has a resistor 68 associated therewith which balances the input offset currents and is in the nature of a 10 K. ohm, ¼ w., (+ or −) 5 percent resistor. A resistor 69 is positioned in the output conductor 63 from the operational amplifiers 58 with the resistors 69 being in the nature of a 10 K. ohm, ¼ w., (+ or −) 1 percent resistor. An amplification completion loop 70 has a filtering capacitor 71 therein with the capacitor 71 being in the nature of a 0.1 mfd. capacitor. The completion loop 70 also has a potentiometer 72 therein with the potentiometer 72 being in the nature of a 200 K. ohm, 15 turn potentiometer and a second potentiometer 73 which provides a zero adjust circuit within the amplification circuit 70. A test point 74 is connected to an output conductor 75 from the second operational amplifier 64 with the amplification completion loop 70 being connected to the conductor 75 to cooperate with the test point 74.

A resistor 76 is connected to the output conductor 75 from the second operation amplifier 64 and is connected to an input conductor 77 for a third operational amplifier 78 with the resistor 76 being in the nature of a 10 K. ohm, ¼ w., (+ or −) 1 percent resistor. The conductor 62 also extends from the resistor 68 to the third operational amplifier 78. An output conductor 79 extends from the third operational amplifier 78. An output conductor 79 extends from the third operational amplifier 78 to the computation circuit 51 and to the readout selector switch 52.

An amplification completion loop 80 is associated with the third operational amplifier 78 and is operative to provide a logarithmic current source. The completion loop 80 extends between the input conductor 77 and the output conductor 79 and includes a log converter 81 and a potentiometer 82 with the log converter 81 including a potentiometer portion 83 with the potentiometer 82 and the potentiometer portion 83 each being in the nature of 10 K. ohm, 15 turn potentiometers.

Each of the operational amplifiers 58, 64 and 78 have an offset balancing potentiometer 84, 85 and 86 respectively connected to a power source 87, as later described. The resistors 84, 85 and 86 are each in the nature of 2.5 K. ohm, ¼ w. resistors. In the illustrated structure, the conductor 62 and conductors 88 and 89 extend from the power source 87 with a capacitor 90 between the conductor 88 and the resistor 61 and a capacitor 91 between the filtering capacitor 60 and the conductor 89 to average the input to substantially eliminate noise in the connection between the power source 87 and the amplification circuit 50.

The computation circuit 51 includes a portion for the red channel, green channel and blue channel respectively with the power source 87 being operatively connected to operational amplifiers 92, 93 and 94 in the red, green and blue channels respectively. A conductor 95 extends between a neutral conductor 96 of the power source 87 and the operational amplifiers 92, 93 and 94 with resistors 97, 98 and 99 being connected between conductor 95 and noninverting inputs of the operational amplifiers 92, 93 and 94 respectively. The resistors 97, 98 and 99 are each in the nature of 30 K. ohm, ¼ w., (+ or −) 5 percent resistors.

Offset balancing potentiometers 100, 101 and 102 are associated with the operational amplifiers 92, 93 and 94 respectively with the potentiometers 100, 101 and 102 each being in the nature of 2.5 K. ohm potentiometers and being connected to the power source 87.

Amplification completion loops 103, 104 and 105 are associated with the red, green and blue channel operational amplifiers 92, 93 and 94 respectively with capacitors 106, 107 and 108 being positioned in the amplification completion loops 103, 104 and 105 respectively to average the input to substantially eliminate noise in the circuit. Resistors 109, 110 and 111 are connected across the amplification completion loops 103, 104 and 105 respectively with each of the resistors 109, 110 and 111 being in the nature of 20 K. ohm, (+ or −) 0.02 percent resistors.

A plurality of resistors 112 are connected to each of the respective amplification loops 103, 104 and 105 and are also in the nature of 20 K. ohm, (+ or −) 0.02 percent resistors. The amplification completion loops 103, 104 and 105 are connected to output conductors 113, 114 and 115 respectively whereby the voltage in the output conductor 113 corresponds to the integral red density or neutral density of the respective color sample 3 and the voltage in the output conductors 114 and 115 corresponds to the integral net densities for the green and blue channels respectively being the equivalent of the integral green and blue values plus or minus a density value necessary to make the red value equal zero thereby eliminating neutral density.

A power source 116 for the phototubes 15 is operatively connected to a suitable AC source for supplying regulated direct current to each of the phototubes 15.

The power source 87 is also connected to the AC source for supplying regulated direct current to the amplification circuits 50 and to the computation circuit 51.

In use, a color sample, such as a color film or a filter pack therefor, is placed over the aperture 4 and the integration bar exit 12 is moved to align with the aperture 4 which activates the lamp 8 and turns off the lamps 24. Diffused light is thereby directed through the respective color sample and into the light-collecting member 14 and then onto the phototubes 15 which send a signal, corresponding to each of the density values of the selected primary colors, to the signal processor 2. Numerical values 16 are displayed on the visual indicators 53 which correspond to the integral red density and green density and blue density. A switch 52, shown in FIG. 1, is manipulated to subtract the lesser density from each of the other densities and thereby display neutral density and net densities and thereby display neutral density and net densities on the visual indicators 53. The present system employs the red density as the neutral density with green and blue densities being net densities for use in determining values for a filter pack for use with production color film during making color prints thereof.

It is to be understood that, while we have illustrated and described one form of our invention, it is not to be limited to the specific form or arrangement of parts herein described and shown.

We claim:

1. A system for analyzing a light-transmitting color sample, comprising:
   a. means for directing substantially infrared-free diffused light through a light-transmitting color sample;
   b. color-responsive sensing means for producing electrical signals in response to received light with the signals corresponding to spectral response functions of the human eye for the primary colors of red and green and blue;
   c. means for receiving light directed through the light-transmitting color sample and diffusing said received light and directing same onto said color-responsive sensing means;
   d. an amplification circuit for each of the primary colors of red and green and blue, said amplification circuits each being electrically connected to said color-responsive sensing means, said amplification circuits each having electrically connected signal distortion prevention means and signal standardization means and output amplification means;
   e. a computation circuit electrically connected to each of said amplification circuits and having a channel for each of the primary colors of red and green and blue, said computation circuit being operative to produce an amplified signal corresponding to each of the densities of the primary colors of red and green and blue present in the light-transmitting color sample;
   f. readout selector switching means electrically connected to said color-responsive sensing means and to each of said amplification circuits and to each channel of said computation circuit; and
   g. visual indicator means electrically connected to said readout selector switching means for displaying numerical density values for the primary colors of red and green and blue.

2. A system for analyzing a light-transmitting color sample as set forth in claim 1 wherein said amplification circuits each include:
   a. an input network electrically connected to said color-responsive sensing means for the respective primary color and to said signal distortion prevention means, said input network being electrically connected to a source of electrical power and having electrical resistance means and circuit noise reduction means in the form of a filtering capacitor;
   b. an amplification completion loop electrically connected to each of said signal distortion prevention means and said signal standardization means and said output amplification means, said amplification completion loop connected to said output amplification means having a log converter with a potentiometer portion therein for providing a logarithmic conversion whereby said respective amplification circuit supplies electrical voltage corresponding to the density of the respective primary color present in the color sample; and
   c. an offset balancing potentiometer electrically connected to each of said signal distortion prevention means and said signal standardization means and said output amplification means, each of said offset balancing potentiometers being electrically connected to the source of electrical power.

3. A system for analyzing a light-transmitting color sample as set forth in claim 1 wherein said computation circuit includes:
   a. an operational amplifier in each of said red channel and green channel and blue channel, said operational amplifiers each being electrically connected to a source of electrical power and having electrical resistance means in said connection;
b. an amplification completion loop electrically connected to said operational amplifier in each of said red and green and blue channels, said amplification completion loops each being electrically connected to an output of said respective amplification circuit and having first electrical resistance means in said connection and second electrical resistance means electrically connected to the amplification completion loop for said green channel and said blue channel, each of said amplification completion loops having electrical resistance means and circuit noise reduction means in the form of a filtering capacitor; and
c. an offset balancing potentiometer electrically connected to said operational amplifier in each of said red and green and blue channels, each of said offset balancing potentiometers being electrically connected to the source of electrical power.

4. A system for analyzing a light-transmitting color sample as set forth in claim 2 wherein said computation circuit includes:
a. an operational amplifier in each of said red channel and green channel and blue channel, said operational amplifiers each having electrical connection with an output of said respective amplification circuit and having first electrical amplifiers each having electrical connection with a source of electrical power and having electrical resistance means in said connection;
b. an offset balancing potentiometer electrically connected to said operational amplifier in each of said red and green and blue channels, each of said offset balancing potentiometers being electrically connected to the source of electrical power; and
c. second electrical resistance means electrically connected to said operational amplifier in said green channel and said blue channel whereby said computation circuit is a subtractive circuit operative to provide output voltages corresponding to integral red density and integral net green density and integral net blue density.

5. A system for analyzing a light-transmitting color sample, comprising:
a. a transmission box having a first portion selectively movable toward and away from a second portion having an aperture in one surface thereof;
b. means in said first portion for directing diffused light through said aperture and through a light-transmitting color sample placed over said aperture, said diffused light-directing means including a light source and means for permitting escape of infrared energy and reflecting the visible portion of the spectrum of light from the light source and directing said visible portion through a plurality of infrared rejection mirrors and into light-diffusing means having an exit alignable with said aperture;
c. color-responsive sensing means for producing electrical signals in response to received light with the signals corresponding to spectral response functions of the human eye for the primary colors of red and green and blue;
d. means within said second portion for receiving light directed through the light-transmitting color sample and through said aperture and for diffusing the received light and directing same onto said color responsive sensing means;
e. signal processing means having a red channel and a green channel and a blue channel, each channel being electrically connected to said color-responsive sensing means and operative to produce an amplified signal corresponding to the density of a respective one of the primary colors of red and green and blue present in the light-transmitting color sample;
f. readout selector switching means electrically connected to said color-responsive sensing means and to said signal processing means;
g. visual indicator means electrically connected to said readout selector switching means for displaying numerical density values for the primary colors of red and green and blue;
h. an amplification circuit for each of the primary colors of red and green and blue, said amplification circuits each being electrically connected to said color-responsive sensing means, said amplification circuits each having electrically connected signal distortion prevention means and signal standardization means and output amplification means; and
i. a computation circuit electrically connected to each of said amplification circuits and having a channel for each of the primary colors of red and green and blue, said computation circuit being operative to produce an amplified signal corresponding to each of the densities of the primary colors of red and green and blue present in the light-transmitting color sample.

6. A system for analyzing a light-transmitting color sample as set forth in claim 5 wherein:
a. said diffused light-directing means includes an ellipsoidal reflector surface with the light source in the form of a lamp positioned at the focal point thereof whereby the reflector surface directs light into the diffusing means in the form of a tubular integration bar having an entrance positioned to receive light from said reflector surface and an exit alignable with said aperture;
b. said color-responsive sensing means is a photomultiplier tube for receiving each of the primary colors of red and green and blue; and
c. said means receiving light directed through the sample and aperture and diffusing the received light and directing same onto the photomultiplier tubes of said color responsive sensing means includes a light-collecting member having a substantially hemispherical upper portion and a generally cylindrical lower portion, said upper portion having an entrance aligned with said aperture and said color-responsive sensing means to direct diffused light onto same whereby the strength of the electrical signal produced thereby is independent of the position of the respective photomultiplier tube.

7. A system for analyzing a light-transmitting color sample as set forth in claim 6 including;
a. a translucent window in said second portion of said transmission box and having said aperture therein;
b. illuminating means within said second portion and below said translucent window for illuminating same to permit location of a selected portion of the color sample over said aperture; and
c. switching means electrically connected to said means for illuminating said window and electrically connected to said diffused light-directing means and responsive to position of said first portion of said transmission box for energizing said window illuminating means when said first portion is away from said second portion and energizing said diffused light-directing means when the exit of said integration bar is aligned with said aperture and also deactuating said window illuminating means thereby having only a measured intensity of diffused light directed through the color sample.